UNITED STATES PATENT OFFICE.

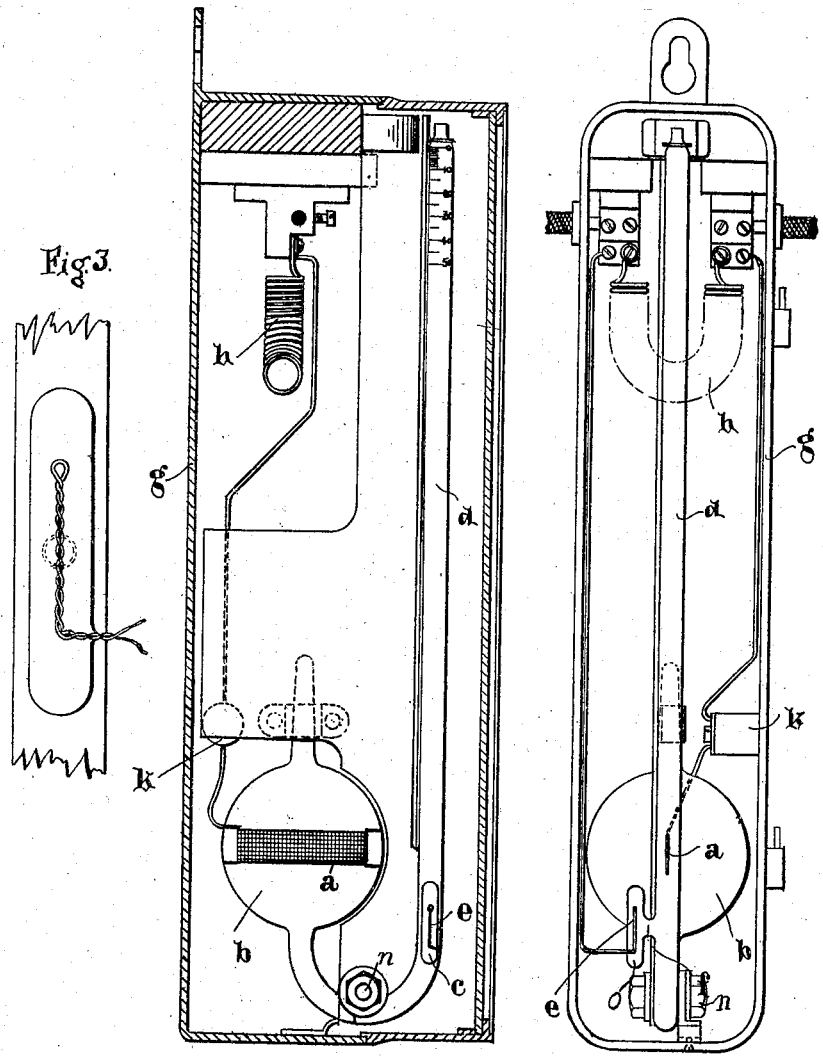

GEORGE HOOKHAM AND SYDNEY HOLMWOOD HOLDEN, OF BIRMINGHAM, ENGLAND.

ELECTROLYTIC METER.

No. 919,724.       Specification of Letters Patent.       Patented April 27, 1909.

Application filed June 1, 1908. Serial No. 435,915.

*To all whom it may concern:*

Be it known that we, GEORGE HOOKHAM and SYDNEY HOLMWOOD HOLDEN, subjects of the King of Great Britain and Ireland, and residing at 4 New Bartholomew street, Birmingham, in the county of Warwick, England, have invented certain new and useful Improvements in Electrolytic Meters, of which the following is a specification.

Our invention relates to electrolytic meters of the hermetically sealed type and has for its object to so construct such meters that their range and accuracy is increased.

A hermetically sealed electrolytic meter of the type referred to consists of an electrolytic cell having an anode capable of absorbing hydrogen or other gas and placed partly in the electrolyte and partly in contact with the hydrogen or other gas to be absorbed, the cathode in the said meter being wholly immersed in the electrolyte.

The present invention consists in inclosing the cathode in a small chamber or bulb which communicates with the tube in which the gas given off at the cathode is measured so that the cathode is always in contact with an atmosphere of gas above the electrolyte.

The invention further consists in the improved electrolytic meter hereinafter described.

Referring to the accompanying drawings, Figure 1 is a sectional elevation of a meter constructed according to our invention, Fig. 2 being a front elevation with the cover removed. Fig. 3 being an enlarged view of the bulb containing the cathode.

In the meter illustrated the electrolytic cell consists of a bulb, $b$, connected to the lower end of a measuring tube, $d$, which is sealed after the admission of the electrolyte. The electrolyte used may be dilute sulfuric acid containing 10% of the acid the quantity used being sufficient to fill the measuring tube and about half the bulb. The anode, $a$, consists of a piece of platinum gauze preferably coated with platinum black and supported across the bulb by platinum wires one or more of which may form one terminal of the cell.

At the lower end of the measuring tube and in communication therewith there is provided a small chamber, or bulb, $c$, containing the cathode, $e$, formed of a spirally twisted loop of platinum wire which enters near the lower end of the small chamber, $c$, and projects above the passage, $f$, connecting the chamber $c$, with the measuring tube, $d$, so that the upper end of this cathode, $e$, always projects into an atmosphere of the gas to be measured.

The cell may be conveniently mounted on a hinge $n$ in a box, $g$, carrying a shunt coil, $h$, and a resistance $k$, in series with the cell, the resistances, $h, k$, being made of the same material which should have a small temperature co-efficient preferably platinoid or German silver so that temperature errors are avoided.

In order to set the meter to zero the cell is tilted so that the measuring tube is filled with liquid, the tube is then replaced in the vertical position to collect the gas given off at the cathode, the gas given off at the anode being absorbed.

By placing the cathode in a separate chamber as above described the range and accuracy of the meter are greatly increased.

Having now described our invention what we claim as new and desire to secure by Letters Patent is:—

1. An electrolytic meter having a storage of gas and an anode capable of absorbing the said gas, said anode being partly immersed in electrolyte and partly in the storage of gas, and a cathode also partly immersed in the electrolyte and partly in gas, as set forth.

2. An electrolytic meter having a chamber partially filled with electrolyte, a measuring tube connected at its lower end to said chamber, a small chamber in communication with said measuring tube, an anode in said first mentioned chamber and a cathode in said small chamber, as set forth.

In testimony whereof, we affix our signatures in presence of two witnesses.

GEORGE HOOKHAM.
      SYDNEY HOLMWOOD HOLDEN.

Witnesses:
  WILLIAM HORTON,
  BERTIE HOGARTH.